US007236612B2

(12) United States Patent
El Bernoussi et al.

(10) Patent No.: US 7,236,612 B2
(45) Date of Patent: Jun. 26, 2007

(54) METHOD OF VIDEO CODING IMAGES COMPRISING ADDRESS INFORMATION

(75) Inventors: Hicham El Bernoussi, Paris (FR); Gilles Moussion, Verrieres le Buisson (FR); Christophe Lhomme, Paris (FR)

(73) Assignee: Solystic, Gentilly Cedex (FR)

( * ) Notice: Subject to any disclaimer, the term of this patent is extended or adjusted under 35 U.S.C. 154(b) by 759 days.

(21) Appl. No.: 10/478,638

(22) PCT Filed: Sep. 9, 2003

(86) PCT No.: PCT/FR03/50048

§ 371 (c)(1),
(2), (4) Date: Nov. 25, 2003

(87) PCT Pub. No.: WO2004/027696

PCT Pub. Date: Apr. 1, 2004

(65) Prior Publication Data

US 2005/0180661 A1    Aug. 18, 2005

(30) Foreign Application Priority Data

Sep. 16, 2002    (FR) .................................. 02/11456

(51) Int. Cl.
*G06K 9/00*    (2006.01)
(52) U.S. Cl. ...................................... 382/101; 705/406
(58) Field of Classification Search ................ 382/100, 382/101, 102, 140, 141, 321; 209/900; 705/406
See application file for complete search history.

(56) References Cited

U.S. PATENT DOCUMENTS

| 4,523,330 | A | | 6/1985 | Cain | |
|---|---|---|---|---|---|
| 5,923,792 | A | * | 7/1999 | Shyu et al. | .................. 382/309 |
| 6,269,171 | B1 | * | 7/2001 | Gozzo et al. | ................ 382/101 |
| 6,295,387 | B1 | | 9/2001 | Burch | |
| 2002/0023135 | A1 | * | 2/2002 | Shuster | ........................ 709/206 |
| 2003/0116482 | A1 | * | 6/2003 | Steinmetz et al | ........... 209/584 |

FOREIGN PATENT DOCUMENTS

| DE | 19707397 A1 | 8/1998 |
|---|---|---|
| DE | 19748702 C1 | 11/1998 |
| JP | 916003 A | 6/1997 |

OTHER PUBLICATIONS

Benedetti, Arrigo, "Confidence computation improvement in an optical field reading system," Document Image Analysis, Jun. 10, 1997, pp 59-65.

* cited by examiner

*Primary Examiner*—Vikkram Bali
*Assistant Examiner*—Anand Bhatnagar
(74) *Attorney, Agent, or Firm*—Sughrue Mion, PLLC

(57) ABSTRACT

The method of processing images (IN) including address information by video coding consists in identifying, for each image rejected by a process for automatically evaluating addresses by OCR, a rejection category corresponding to the rejected image by means of a cascade of filters (F1–F4) applied to confidence ratings in the image attribute vector associated with the rejected image, and when the rejection category corresponding to the rejected image is identified at a filter, in causing said filtering to be followed firstly by operator encoding (VC1–VC4) specific to the rejection category so as to add to or modify the image attribute vector associated with the rejected image, and secondly by evaluating (E) the image attribute vector associated with the rejected image so as to be able to decide when to stop video coding for the rejected image.

7 Claims, 2 Drawing Sheets

FIG_1
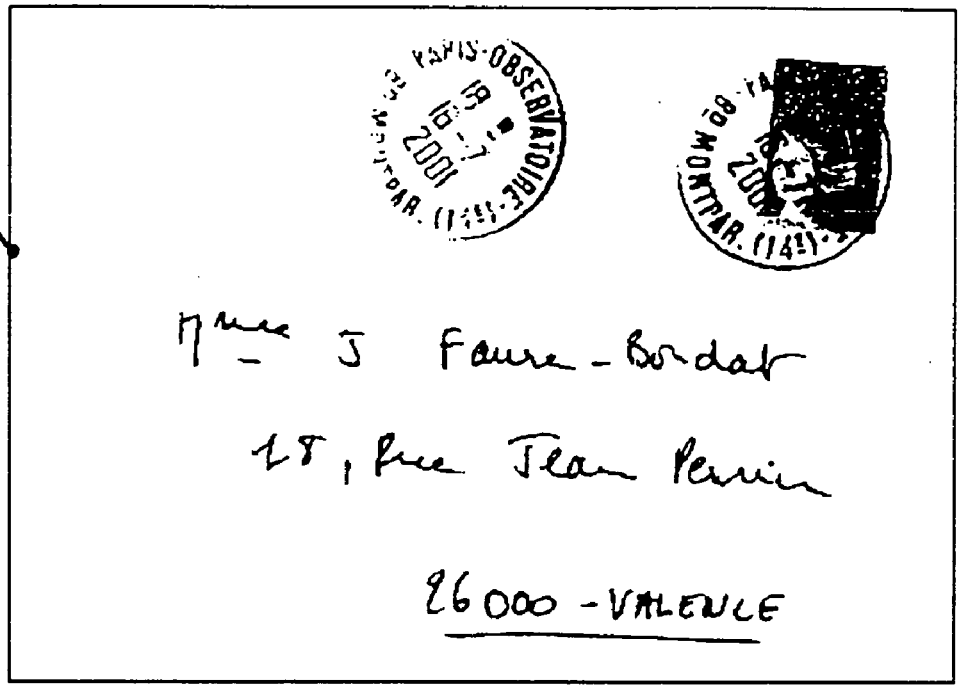

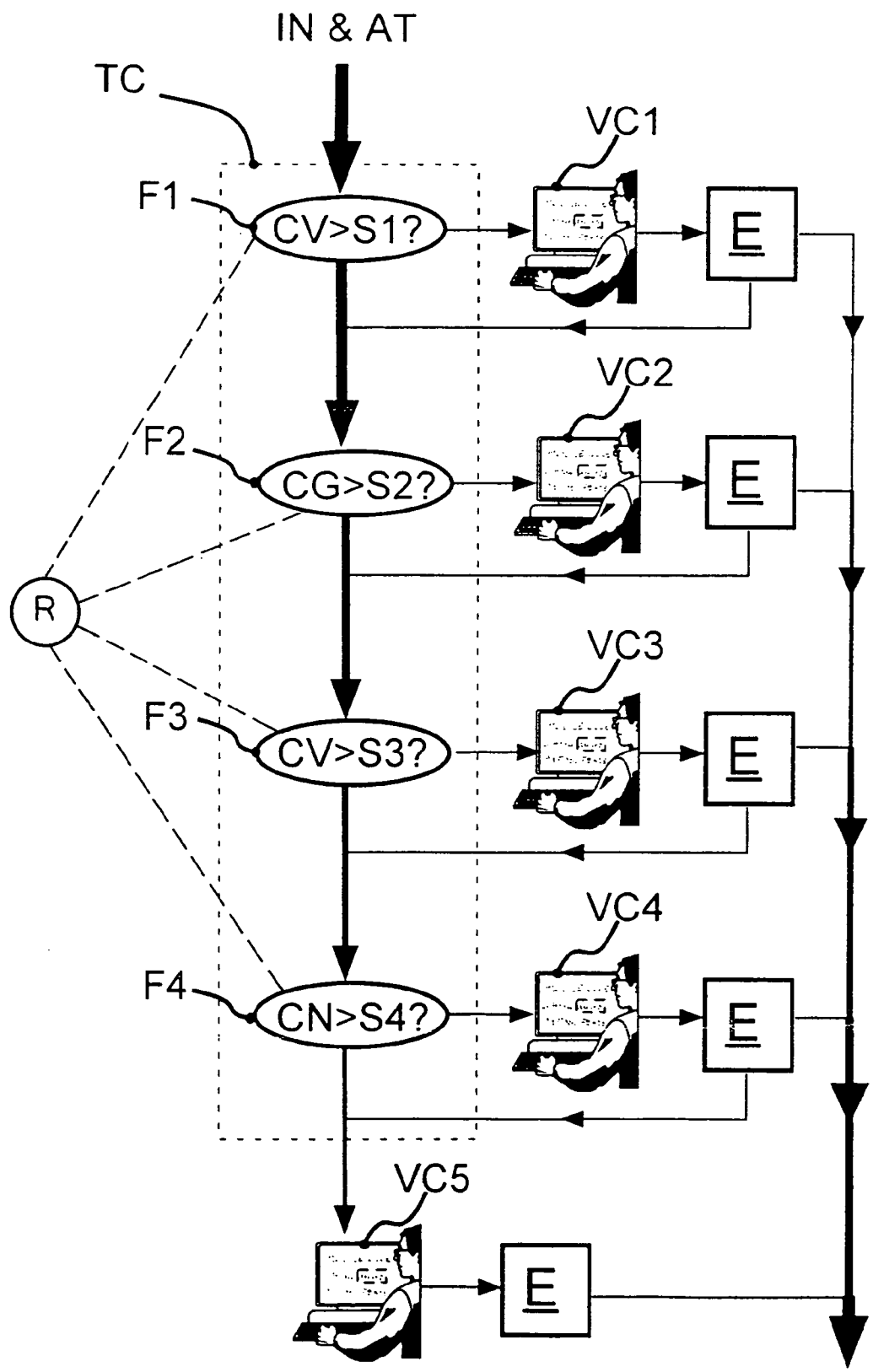

METHOD OF VIDEO CODING IMAGES COMPRISING ADDRESS INFORMATION

The invention relates to automatic sorting of postal items and in particular it relates to systems in which an automatic process of address evaluation is applied by optical character recognition (OCR) to an image of a postal item that includes address information, the process being added to and improved by video coding when the address information cannot be interpreted automatically by OCR. At the end of video coding, the address fields are generally sufficiently complete to achieve the desired level of sorting.

More particularly, the invention relates to a method of using video coding to process an image of a postal item that includes address information and that has been rejected by a process for automatically evaluating addresses by OCR.

In European patent document No. 97/921794, the processing of images including address information by video coding consists in systematically encoding all or part of various fields in the address block in order to identify unambiguously the destination of the postal item. Various encoding techniques are used such as encoding by outline, encoding by extracting, encoding by complementing, encoding by selecting.

Although those various video coding techniques tend to increase the productivity of video coding operators, they do not take full advantage of the results provided by the process of automatically evaluating addresses by OCR. In general, the result of a process of automatically evaluating addresses by OCR is presented in the form of a vector of image attributes containing all of the information extracted by the OCR and characterizing address information (typography of the address information: handwritten/typewritten), number and coordinates of lines of information detected in the address block by OCR, or indeed for each field of the address block, a field value associated with a confidence rating. The confidence rating associated with a field value represents the probability that the field value extracted by OCR has been properly recognized.

FIG. 1 shows an image including address information IN together with the structure of an image attribute vector AT having address fields V and N containing information, the field V identifying the street name (V=RUE JEAN PERRIN) in the address block, and the field N identifying the number in the street (N=18) in the address block. These address field values are associated with confidence ratings CV and CN specifying in this case that the street name has been recognized with recognition probability of 1 (maximum confidence level) whereas the number in the street has been recognized with recognition probably of 0.38. In addition, in the image attribute vector, a combined confidence CG rating corresponds to the product of all of the confidence ratings associated with the address fields serves to give an indication of the overall recognition probability of the address information. This combined confidence rating is used by the automatic OCR evaluation process to decide to reject an image which will therefore need to be processed by video coding, with the decision being made, for example, by comparing the combined confidence rating with a predetermined threshold value.

Careful analysis of results provided by an automatic process for evaluating addresses by OCR during a test campaign on a set of images rejected by a geographical inward sorting process, for example, has shown that the causes of rejection can be classified into major categories. Thus, in this test campaign, the following was found, for example:

- in 34% of cases of rejection, the address fields V and N were correctly recognized by the OCR but the combined confidence rating issued by the OCR was too low;
- in 14% of cases of rejection, the address field V was correctly recognized but not the address field N;
- in 25% of cases of rejection, the address field V was not correctly recognized whereas the address field N was correctly recognized;
- in 26% of cases of rejection, neither of the address fields V and N were correctly recognized; and
- only 1% of cases of rejection related to other situations of faulty recognition.

On the basis of this observation, it appears possible to filter the 34% group of rejected images on the basis of thresholding the combined confidence rating. Similarly, the 14% of rejected images could be filtered on the basis of thresholding the confidence rating CV while the 25% group of rejected images could be filtered on the basis of thresholding the confidence rating CN. By classifying rejected images on the basis of categories, it becomes possible to apply specific video coding processes to each category of rejected images that is adapted to the category in question, thereby minimizing operator time and thus increasing the throughput the video coding system. If a rejected image does not fall into any predetermined rejection category, then it needs to be processed by video coding that scans all of the address fields, which is expensive in time. Clearly the number of rejection categories is a function of address structure and the number of address fields. It will thus be understood that categorizing rejected images in this way enables rejected images to be processed in a manner that is not uniform but rather that is adaptive.

To this end, the invention provides a method of using video coding to process images that include address information and that have been rejected by an automatic process for evaluating addresses by OCR, e.g. for geographical inward sorting. Naturally, the method is easily generalized to other types of rejection, e.g. outward sorting, post office boxes, readdressing, company sorting. For each rejected image, the process of automatically evaluating addresses by OCR produces an image attribute vector in which confidence ratings are associated with respective field values in the address block. According to the invention, for each rejected image, the method consists in identifying a rejection category that corresponds to the rejected image by applying a cascade of filters (where the number of filters may vary as a function of the type of rejection that is to be processed) acting on the confidence ratings in the image attribute vector associated with the rejected image, and once the rejection category corresponding to the rejected image has been identified by a filter, in causing the filtering to be followed firstly by operator encoding that is specific to the rejection category so as to add to or modify the image attribute vector associated with the rejected image, and secondly by evaluating the image attribute vector associated with the rejected image so as to be able to decide when to stop video coding for this rejected image. The various operator encoding operations may be implemented respectively in different video coding units or consoles, thereby presenting the advantage of having video coding operators who are specialized in particular rejection categories, thereby improving their performance. One example of filtering can consist in thresholding on a single confidence rating or on a combined confidence rating or indeed on a combination of thresholds for a plurality of confidence ratings associated with different fields of the address block. It is also possible to refine filtering with the help of expert rules and to extend filtering to portions of the attribute vector other than the values in the address fields and the associated confidence ratings, without thereby going beyond the ambit of the invention. When filtering by thresholding, it is advantageous to have threshold values that are adjustable dynamically by a supervisor monitoring the proportions of images that are passing through the various filters. Adjusting threshold values also makes it possible to vary both the throughput and the error rate of the video coding system. It is known that video coding all of the address fields needed for inward sorting is considered by postal operators as being unprofitable because it takes place at too small a rate of throughput. With the method of the invention, by using the cascade of filters, it is possible to weed out rejected images that are unprofitable for processing by video coding. More particularly, the threshold values of the filters can be adjusted to retain only those images of postal items for which video coding processing remains quicker than manually sorting the postal items. Common rates of throughput for manual sorting are about 1600 to 1800 items an hour, which means that in order to exceed that rate of throughput by video coding, each rejected image must be dealt with by video coding in less than 2 seconds, which means, for example, there can be no question of inputting a long string of characters as a video coding operation, e.g. there can be no question of keying-in the street name field V (illustrated in FIG. 1).

The invention is described in greater detail below with reference to the drawings.

FIG. 1 is an image corresponding to address information and a corresponding image attribute vector.

FIG. 2 is a block diagram illustrating the method of the invention.

In FIG. 1, an automatic process for evaluating addresses by OCR in a postal sorting installation has responded to an image IN that includes address information by producing an image attribute vector AT made up of field values V and N in the address block, which values are associated with confidence ratings CV and CN and with a combined confidence rating CG which is the product of the confidence ratings CV and CN.

Generally, when the combined confidence rating CG is less than a predetermined threshold, the automatic evaluation of the address by OCR has not been able to solve the address unambiguously, so the image IN and the corresponding image attribute vector AT are sent for processing by video coding.

In the example of FIG. 1, although the combined confidence rating CG represents an address that has been solved ambiguously, the value for address field V has been recognized unambiguously. In order to solve the address unambiguously it suffices to ask a video coding operator to confirm the value of the N address field, with it being necessary for the operator to enter a new value for the N address field only in the event of the operator not confirming the value given. Encoding by confirmation is inexpensive in operator time and less expensive in operator time than is encoding by inputting information whether by extracting, selecting, or complementing information. According to the invention, a cascade of filters on the confidence ratings in the image attribute vector AT is used to identify the rejection category that corresponds to the rejected image IN in order to apply processing that is specific to this rejection category, e.g. encoding by confirmation followed by encoding by inputting information.

FIG. 2 shows a cascade of filters F1 to F4 each followed by operator encoding VC1 to VC4 and evaluation E of the image attribute vector AT. The filters F1 to F4 constitute a kind of classifier TC of rejected images and they serve to determine a corresponding number of categories of rejected images.

In the example of FIG. 2, each filter F1 to F4 compares a confidence rating CV, CN, CG with a threshold value S1 to S4. The filters in FIG. 2 are organized to correspond to the types of rejection described above. In the filter F1 that is furthest upstream, if the confidence rating CV (confidence rating on the street name) is greater than the threshold S1, then keyboard encoding VC1 is performed to enter the street number.

In the subsequent filter F2, if the combined confidence rating CG is greater than threshold S2, then confirmation encoding VC2 is performed by pressing a key or by voice synthesis simultaneously on the street number and on the street name.

In filter F3, if the confidence rating CV (relating to street name) is greater than threshold S3, then confirmation encoding VC3 is performed initially on the street name followed by keyboard encoding to enter the street number.

In filter F4, if the confidence rating CN (relating to the street number) is greater than threshold S4, then confirmation encoding VC4 is performed on the street number and keyboard encoding to enter the street name.

At the output from the cascade of filters, keyboard encoding VC5 is performed in which the operator fills in all of the fields in the address block, since under these circumstances the information encoded by OCR is not reliable.

The filters F1 to F4 are ordered so that the encoding operations to be performed by operators become progressively more expensive in operator time.

With this type of rejection, the threshold values in the filters F1 to F4 are adjusted as follows: for S1 a threshold of 0.99; for S2 a threshold of 0.93; for S3 a threshold of 0.85; and for S4 a threshold of 0.83.

On the basis of these threshold values, the image IN in FIG. 1 is video encoded in the branch of filter F1. The time required for encoding is about 1385 milliseconds (ms) which is much shorter than encoding all of the fields in the address block which is estimated as being 4000 ms.

Another example of attributes for a rejected address:

V=AVENUE GAMBETTA

CV=0.98

N=?9

CN=0.0

CG=0.0

Since the confidence rating CV is less than 0.990 (the value of threshold S1), the image is rejected by the filter F1. It is sent to the filter F2. The confidence rating CG is less than 0.93. The image is rejected by the filter F2 and is sent to the filter F3. Since the confidence rating CV is greater than 0.85, confirmation encoding VC3 is applied to the street name and then keyboard encoding is used to enter the number in the street. The time required for encoding is equal to about 1600 ms=street confirmation (about 1385 ms)+key in street number (about 215 ms).

Another example of attributes for a rejected image:

V=RUE DE MONTFAUCON

CV=1.0

N=6??6

CN=0.0

CG=0.0

The video coding process is identical to that of the example of FIG. 1 and the encoding time is thus about 1385 ms.

Another example of attributes for a rejected image:
V=RUE AUGUSTE PERRET
CV=0.98
N=8
CN=0.99
CG=0.97

The image is rejected by the filter F1 since the confidence rating CV is less than S1. It is sent to the second filter F2. The combined confidence rating CG is greater than 0.85 so video coding VC2 is applied. The mean encoding time is equal in this case to about 1309 ms.

Another example of attributes for a rejected image:
V=PLACE FRANCOIS TRUFFAUT
CV=0.62
N=2
CN=0.85
CG=0.51

In this case the image is rejected by the filters F1, F2, F3, and F4 so it is subjected to video coding in VC5. The encoding time is 4000 ms. This is the least favorable circumstance.

As shown in FIG. 2, after operator encoding VC1 to VC4, the image attribute vector AT associated with an image IN that is being subjected to video coding is added to or modified and the image attribute vector is evaluated at E following each video coding operation in order to decide when to stop video coding on this rejected image (because address information has been fully recognized). When it is not decided to stop video coding at a certain level of filtering, then the processing is continued by the following level of filtering, as shown by arrows in FIG. 2.

FIG. 2 shows clearly the cascaded structure of filters with, at each level of filtering, operator action such as VC1, VC2, VC3, and VC4 and associated evaluation E. Since the operator actions VC1 to VC4 are specific to the filters F1 to F4 respectively, the processing lines F1-VC1-E; F2-VC2-E, etc . . . are implemented in different video coding units or consoles where the operators are specialized for different rejection categories.

FIG. 2 also shows a supervisor R automatically adjusting the threshold values S1 to S4 in dynamic manner in the filters F1 to F4.

In order to ensure that processing by video coding is profitable, the cascade of filters may comprise only the first three levels of filtering F1 to F3, and if a rejected image is not identified by at least one of these three levels of filtering, then it is not processed by video coding and the corresponding postal item will be sorted manually. This makes it possible to obtain a mean rate of throughput by video coding of about 2300 postal items per hour. More particularly, in an outward-inward sorting process, the processing of rejected images by video coding in accordance with the invention using the first three levels of filtering F1 to F3 can be implemented in line with the process of performing automatic evaluation by OCR if, for example, the filters F1–F3 are adjusted to classify only images in which the outward sorting postal information has already been recognized unambiguously by the OCR because the video coding operations VC1 to VC3 can be performed in substantially the same amount of processing time as video coding for outward sorting.

The invention claimed is:

1. A method of processing images (IN) of postal items by video coding, each image including address information, said images having been rejected by an automatic process of evaluating addresses by OCR, the method being characterized in that it consists:
    in producing an image attribute vector (AT) for each rejected image, the vector being constituted by confidence ratings (CV, CN) associated with the fields (V, N) of the address block forming the address information;
    in categorizing each rejected image by means of a cascade of filters (F1–F4) acting on the confidence ratings of the attribute vector of said image, the filter levels in the cascade of filters identifying different rejection categories and determining for each rejection category a specific kind of processing by video coding; and
    when a rejection category corresponding to the rejected image is identified at a filter level, in causing said filtering to be followed firstly by processing by video coding (VC1–VC4) specific to the rejection category so as to add to or modify the image attribute vector of the rejected image, and secondly by evaluation (E) of the attribute vector of the rejected image so as to be able to decide when to stop video coding on this rejected image.

2. A method according to claim 1, in which the various filtering levels (F1–F4) with the video coding processes (VC1–VC4) and the evaluation (E) of the corresponding image attribute vector (AT) form a set of processing lines which are implemented respectively in different video coding units or consoles.

3. A method according to claim 1, in which each filtering level (F1–F4) consists in comparing at
    least one confidence rating (CV, CN, CG) of the attribute vector (AT) of the rejected image with a threshold value S1–S4).

4. A method according to claim 3, in which the threshold values (S1–S4) are adjusted dynamically by a supervisor (R) monitoring the proportions of rejected images that are passing through the various filtering levels.

5. A method according to claim 1, in which the address information is address information for postal inward sorting, in which the address block comprises a first field (V) giving a street name and a second field (N) giving a number in the street, in which the image attribute vector (AT) includes a first confidence rating (CV) associated with the first field (V) of the address block, a second confidence rating (CN) associated with the second field (N) of the address block, and a combined confidence rating (CG) equal to the product of said confidence ratings associated with said first and second fields of the address block, and in which the cascade of filters and specific video coding processes is constituted by the following filtering and processing levels:
    a) if the first confidence rating (CV) is greater than a first threshold value (S1), then the number in the street is input by video coding (VC1);
    b) if the combined confidence rating (CG) is greater than a second threshold value (S2), then both the number in the street and the name of the street are confirmed by video coding (VC2); and
    c) if the first confidence rating (CV) is greater than a third threshold value (S3), then the street name is confirmed by video coding (VC3), after which the number in the street is input.

6. A method according to claim 5, in which confirmation by video coding is performed by voice synthesis.

7. A method of outward and inward sorting of postal images, characterized in that it makes use of processing by video coding images (IN) of postal items in accordance with any one of claims 1 to 6, in which if no rejection category is identified for a rejected image after the cascade of filters, then the postal item corresponding to the rejected image is sent to a manual sorting process.

* * * * *